(12) United States Patent
Tiwari et al.

(10) Patent No.: US 8,272,987 B2
(45) Date of Patent: Sep. 25, 2012

(54) SINGLE PLANETARY, SINGLE MOTOR/GENERATOR HYBRID POWERTRAIN WITH THREE OR MORE OPERATING MODES

(75) Inventors: Awadesh Tiwari, Bangalore (IN); Ravikanth G V, Karnataka (IN); Atul Kumar Agrawal, Karnataka (IN); Deepa Kesavan, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 12/579,702

(22) Filed: Oct. 15, 2009

(65) Prior Publication Data
US 2011/0092328 A1 Apr. 21, 2011

(51) Int. Cl.
*F16H 3/72* (2006.01)
*B60K 1/02* (2006.01)
*B60K 6/20* (2007.10)

(52) U.S. Cl. .............................. 475/5; 477/3; 180/65.21
(58) Field of Classification Search .......... 475/5; 477/3, 477/4, 5; 180/65.21, 65.225, 65.235, 65.24
See application file for complete search history.

(56) References Cited

U.S. PATENT DOCUMENTS

| | | | |
|---|---|---|---|
| 5,558,595 A | 9/1996 | Schmidt et al. | |
| 5,789,823 A | 8/1998 | Sherman | |
| 5,931,757 A | 8/1999 | Schmidt | |
| 6,474,428 B1 | 11/2002 | Fujikawa et al. | |
| 6,478,705 B1 | 11/2002 | Holmes et al. | |
| 6,492,742 B1 | 12/2002 | Fujikawa et al. | |
| 6,527,658 B2 | 3/2003 | Holmes et al. | |
| 7,237,634 B2 * | 7/2007 | Severinsky et al. | 180/65.23 |
| 7,980,980 B2 * | 7/2011 | Rask et al. | 475/5 |

OTHER PUBLICATIONS

Ozeki, Tatsuya and Umeyama, Mituhiro; Development of Toyota's Transaxle for Mini-van Hybrid Vehicles Mar. 4, 2002-Mar. 7, 2002.

* cited by examiner

*Primary Examiner* — David D Le
*Assistant Examiner* — Colby M Hansen
(74) *Attorney, Agent, or Firm* — Quinn Law Group, PLLC

(57) ABSTRACT

A hybrid powertrain has an engine, an input member, an output member, and a stationary member, and includes a single planetary gear set having a first, a second, and a third member. The input member is connected for common rotation with the engine and the output member is connected for common rotation with the second member. A single motor/generator is continuously connected for common rotation with the third member. A starter motor is operatively connected to the engine for starting the engine. A first torque-transmitting mechanism is selectively engagable to connect the input member for rotation with the first member. A second torque-transmitting mechanism is selectively engagable to ground the first member to the stationary member. A third torque-transmitting mechanism is selectively engagable to ground the third member to the stationary member. The powertrain is operable in an electric-only operating mode, an engine-only operating mode, and an electrically-variable operating mode.

16 Claims, 2 Drawing Sheets

SINGLE PLANETARY, SINGLE MOTOR/GENERATOR HYBRID POWERTRAIN WITH THREE OR MORE OPERATING MODES

TECHNICAL FIELD

The invention relates to a hybrid powertrain, and specifically to a hybrid powertrain with a single motor/generator, an engine with a starter motor, and a single planetary gear set.

BACKGROUND OF THE INVENTION

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and an electrically-variable operating mode are established by engaging brakes and/or clutches in different combinations and controlling the engine and motor/generators. The various operating modes are advantageous as they may be used to improve fuel economy. However, the additional components required for a hybrid powertrain, such as the motor/generators, brakes and/or clutches, may increase overall vehicle cost.

SUMMARY OF THE INVENTION

A hybrid powertrain is provided with a minimal number of components without sacrificing available operating modes and performance advantages. For example, the powertrain has only one planetary gear set and one motor/generator, and yet is operable in an engine-only mode, an electric-only mode and an electrically-variable mode. Additionally, reaction torque is not lost during transitions between the modes. Furthermore, system failures, such as a failure affecting the motor/generator, may be detected and the powertrain controlled to protect against damage to the motor/generator under such circumstances.

Specifically, the hybrid powertrain has an engine, an input member, an output member, and a stationary member, such as a transmission casing, and includes a single planetary gear set having a first, a second, and a third member. Preferably, the first member is a ring gear member, the second member is a carrier member, and the third member is a sun gear member. The input member is connected for common rotation with the engine and the output member is connected for common rotation with the second member. A single motor/generator is continuously connected for common rotation with the third member. A starter motor is operatively connected to the engine for starting the engine. A first, a second, and a third torque-transmitting mechanism are included. The first torque-transmitting mechanism is selectively engagable to connect the input member for rotation with the first member. The second torque-transmitting mechanism is selectively engagable to ground the first member to the stationary member. The third torque-transmitting mechanism is selectively engagable to ground the third member to the stationary member. The torque-transmitting mechanisms are engaged in different combinations to establish an electric-only operating mode, an engine-only operating mode, and an electrically-variable operating mode. Optionally, a fourth torque-transmitting mechanism may be provided to connect the input member with the third member, to offer two additional fixed gear ratios when engaged in combination with the first and the second torque-transmitting mechanisms, respectively.

One or more controllers are operable to monitor operating conditions of the motor/generator, such as failures of components associated with the motor/generator or failure of the motor/generator itself. Under predetermined operating conditions indicative of such a failure, one of the controllers will engage the third torque-transmitting mechanism to brake the motor/generator and engage the first torque-transmitting mechanism to establish an engine-only operating mode in response to the monitored operating conditions. By braking the motor/generator and relying on power from the engine, damage to the motor/generator is prevented.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
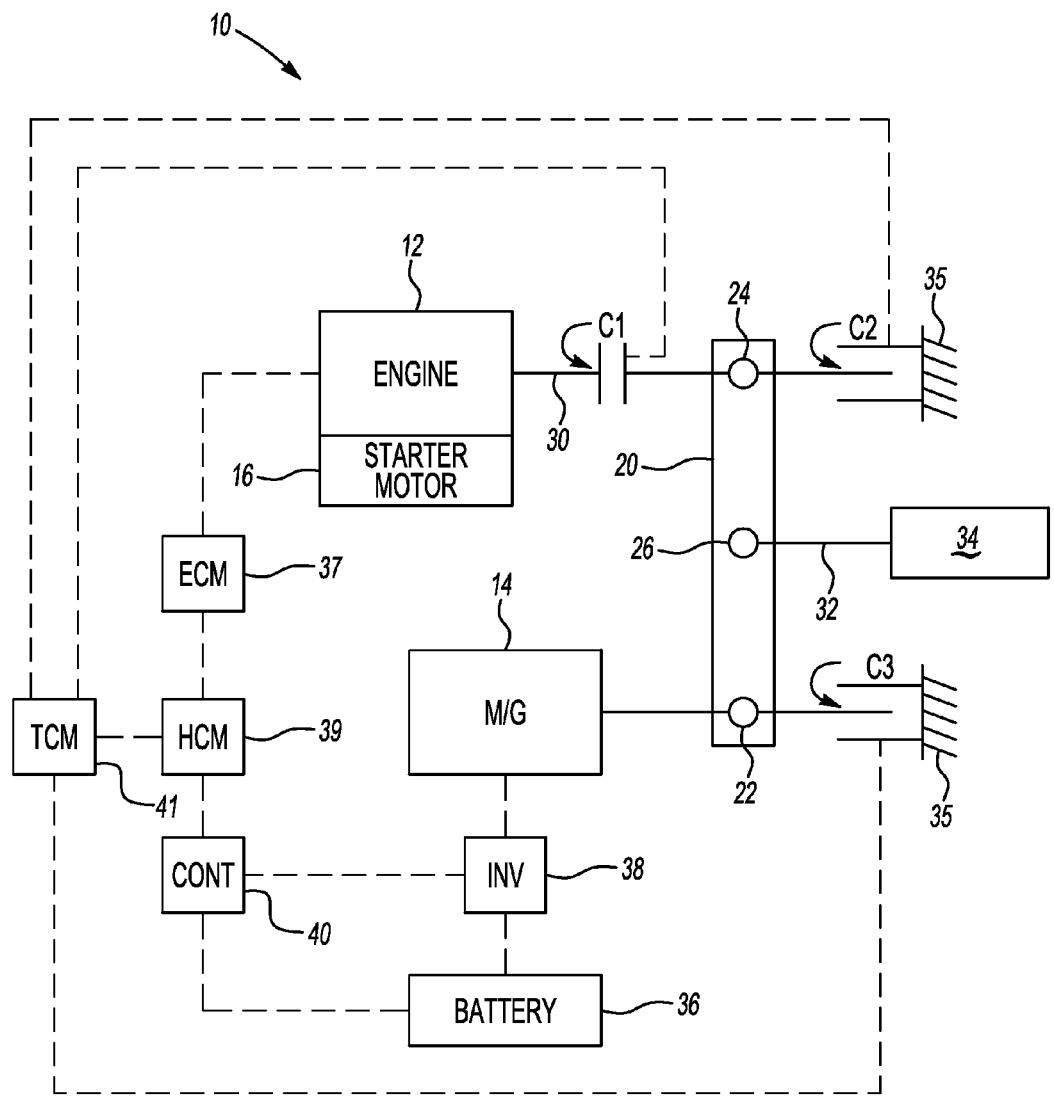
FIG. 1 is a schematic illustration of a first embodiment of a hybrid powertrain.

Referring to the drawings, wherein like reference numbers refer to like components throughout the several views, FIG. 1 shows a hybrid powertrain 10 for a vehicle. The powertrain 10 includes an engine 12 as one power source. The engine 12 may be a diesel engine, a gasoline engine, an air engine, a fuel cell, or other type of power source other than an electric motor/generator. The powertrain 10 further includes an electric motor/generator 14. The motor/generator 14 is the only motor/generator used to provide torque to the powertrain 10. Accordingly, the powertrain 10 may be referred to as a "single motor" or "single motor/generator" powertrain. A conventional starter motor 16 is included for starting the engine 12, either for vehicle launch or in an engine start/stop mode, as further described below. However, the starter motor 16 is not operable as a generator, and is not sized for supplying driving torque to the powertrain 10 (i.e., torque supplied to the final drive and wheels of the vehicle).

The powertrain 10 includes a single planetary gear set 20 that has a sun gear member 22, a ring gear member 24, and carrier member 26. The carrier member 26 rotatably supports a plurality of pinion gears (not shown) that mesh with both the sun gear member 22 and the ring gear member 24, as is well understood by those skilled in the art. A person of ordinary skill in the art will readily understand the function and operation of planetary gear sets. As used herein, the ring gear member 24 is referred to as a first member of the planetary gear set 20, the carrier member 26 is referred to as a second member of the planetary gear set 20, and the sun gear member 22 is referred to as a third member of the planetary gear set 20. The members of the planetary gear set 20 may be arranged differently without departing from the scope of the claimed invention. Furthermore, a compound planetary gear set may be used in lieu of the simple planetary gear set 20, or a differential gear set may be used instead of a planetary gear set.

The engine 12 has an engine output member, such as a crankshaft, that is connected for common rotation with an input member 30. An output member 32 is connected for common rotation with the carrier member 26 and with transmission gearing 34, which may be a final drive or a transmission gearbox having additional intermeshing gears and torque-transmitting mechanisms (not shown).

Three torque-transmitting mechanisms are provided, including a first rotating-type clutch C1, a second stationary-type brake C2, also referred to as a brake, and a third stationary-type brake C3, also referred to as a brake. Clutch C1 is selectively engagable to connect the input member 30 (and thereby the engine 12) for common rotation with the ring gear member 24. As used herein, "common rotation" means rotation at the same speed, including zero speed, or no rotation. Brake C2 is selectively engagable to ground the ring gear member 24 to a stationary member 35, which may be a transmission casing or other non-rotating member. Brake C3 is selectively engagable to ground the sun gear member 22 (and thereby the motor/generator 14) to the stationary member 35.

The motor/generator 14 has both a stator and a rotor. The stator is connected with an energy storage device, such as a battery 36 through a power inverter 38 that converts direct current supplied from the battery 36 to alternating current used for powering the motor/generator 14 when the motor/generator 14 functions as a motor, or converts alternating current from the stator to direct current to be stored in the battery 36 when the motor/generator functions 14 as a generator, as is well understood by those skilled in the art. The advantages of the powertrain 10 could also be achieved if a hydraulic or pneumatic chamber were used in lieu of a battery as the energy storage device for the motor/generator.

A motor control processor 40 is connected to the motor/generator 14 to control electrical energy flow between the stator of the motor/generator 14 and the battery 36 to control whether the motor/generator 14 functions as a motor or a generator and the amount of torque and speed of the rotor thereof according to stored algorithms and vehicle operating conditions, as is well understood by those skilled in the art. The motor/generator 14 may be configured to be rechargeable from a power grid, so that the powertrain 10 may be a plug-in hybrid.

An engine control module (ECM) 37 is operatively connected with the engine 12 and with other vehicle components, such as an accelerator position sensor, a wheel speed sensor, etc., to control operation of the engine 12 (such as engine speed, starting or stopping) in accordance with a stored algorithm. A hybrid control processor (HCM) 39 is operatively connected to the ECM 37 and to the motor control processor 40.

The ECM 37 is used to control the starter motor 16 and other components of the engine 12. A transmission control module (TCM) 41 that may be part of a transmission electro-hydraulic control module (TEHCM) including a valve body and solenoid valves is used to control engagement of torque-transmitting mechanisms, clutch C1 and brakes C2 and C3, such as by actuating valves that control hydraulic fluid used to engage the torque-transmitting mechanisms C1, C2 and C3. Some or all of the ECM 37, HCM 39, CONT 40 and TCM 41 may be integrated as a single controller.

The powertrain 10 is operable in several different modes. Launch of a vehicle with powertrain 10 may be accomplished with power supplied by the motor/generator 14 in an electric-only operating mode, or, alternatively, by the engine 12 in an engine-only operating mode. To establish the electric-only operating mode, brake C2 is engaged to provide reaction torque at the ring gear member 24, and the motor/generator 14 is controlled to operate as a motor, providing torque to sun gear member 22, which is provided to the output member 32 through the planetary gear set 20 to propel the vehicle. The electric-only operating mode may be used for launching the vehicle to achieve better fuel economy, as engine friction is high at vehicle launch. The electric-only operating mode is also used during regeneration, to capture energy during vehicle deceleration and braking.

Alternatively, launch of the vehicle may be in an engine-only operating mode. Brake C3 is engaged to provide reaction torque at the sun gear member 22. Either the starter motor 16 or the motor/generator 14 may be used to start the engine 12. If the engine 12 is started using the starter motor 16, clutch C1 is slipped to provide torque to the ring gear member 24 until the ring gear member 24 rotates at the same speed as the engine crankshaft, with torque carried through the planetary gear set 20 to the output member 32 in a fixed gear ratio between the input member 30 and the output member 32 that is dependent upon the tooth counts of the ring gear member 24 and the sun gear member 22. The engine-only operating mode may be selected when the temperature of the battery 36 is outside of a predetermined acceptable temperature range (i.e., when the battery 36 is considered to be too cold or too hot for supplying power). Additionally, if the battery 36 is at a full state of charge, and the vehicle is cruising at relatively high speeds, it may be more efficient to operate in an engine-only operating mode than to discharge the battery 36, as electromagnetic losses are higher and the electro-mechanical path is not as efficient. The engine-only, fixed gear operating mode is efficient during high speed cruising, when torque requirements are low.

If the powertrain 10 is launched in the electric-only operating mode, it may remain in that mode until vehicle speed requires peak power of the motor/generator 14 and/or the battery state of charge falls below a specified minimum state of charge due to heavy usage. The engine 12 may then be started in an engine start/stop operating mode by controlling the starter motor 16 to crank the engine 12 and releasing brake C2 once the engine 12 gains starting speed. Because the motor/generator 14 is not used to start the engine 12 in the start/stop mode, there is no loss of propulsion at the output member 32. Once the engine 12 is started, torque from the engine 12 may be added to the output member 32 by engaging clutch C1 with a controlled slip prior to full engagement to establish an electrically-variable operating mode in which torque from both the engine 12 and the motor/generator 14 is combined through the planetary gear set 20 at the output member 32 to meet higher acceleration demand from the driver. During the electrically-variable operating mode, the motor/generator 14 may be controlled to operate as a generator, converting torque from the sun gear member 22 into stored electrical energy in the battery 36 to slow the output member 32, such as during vehicle braking.

The powertrain 10 is designed such that there is no loss of reaction torque during transitions between any of the modes. For example, in transitioning from the electric-only operating mode to the electrically-variable operating mode, by controlling off-going brake C2 and oncoming clutch C1, reaction torque at the ring gear member 24 can be maintained. When transitioning from the electrically-variable operating mode to the electric-only operating mode, clutch C1 is disengaged while brake C2 is engaged. When transitioning from the electric-only operating mode to the engine-only operating mode, brake C3 is engaged while clutch C1 is engaged and brake C2 is disengaged. When transitioning from the engine-only operating mode to the electric-only operating mode, clutch C1 is engaged while brake C2 is disengaged and brake C3 is engaged. When transitioning from the engine-only operating mode to the electrically-variable operating mode, brake C3 is disengaged. When transitioning from the electrically-variable operating mode to the engine-only operating mode, brake C3 is engaged to provide reaction torque.

Furthermore, the powertrain 10 is designed to transition to the engine-only operating mode in the event of motor-related failures, such as a failure of the motor control processor 40, the failure of a motor for an auxiliary pump used to provide lubricating fluid flow to the torque-transmitting mechanisms C1, C2 and C3 when the engine 12 is off, or a failure of motor contactor controls. In the event of such a failure, which may be indicated to the ECM 37, HCM 39, CONT 40 or TCM 41 by various sensors configured to sense vehicle operating conditions, the TCM 41 provides a control signal to cause engagement of brake C3, braking the motor/generator 14 to protect it from damage that may occur if it is operated during the failure event. The powertrain 10 is further controlled to engage clutch C1 to establish the engine-only operating mode during such a failure event.

The powertrain 10 is of a reduced cost compared to other hybrid powertrain configurations as it requires only a single motor/generator 14, one planetary gear set 20, and only one rotating clutch C1. Overall weight is also reduced in comparison to a hybrid powertrain with two motor/generators. A relatively inexpensive starter motor 16 is used to start the engine 12 in a start/stop mode, instead of an additional motor/generator. Because reaction torque is available at the sun gear member 22, the powertrain 10 can be operated in an engine-only operating mode in the event of motor-related failures. Because only one motor/generator is used, the battery 36 is downsized relative to a battery configured to power two motor/generators. A desirable electric range and fuel economy of the powertrain 10 are still provided with the low cost design, due to the availability of the engine-only and electrically-variable operating modes. The electric range is comparable to other existing architectures that have two motor/generators because the single motor/generator 14 is connected to the sun gear member 22 to provide higher torque and hence range. Because the engine-only operating mode is as efficient as the electrically-variable operating mode, the fuel economy achieved should remain comparable to that of architectures with two motor/generators.

Figure 2:
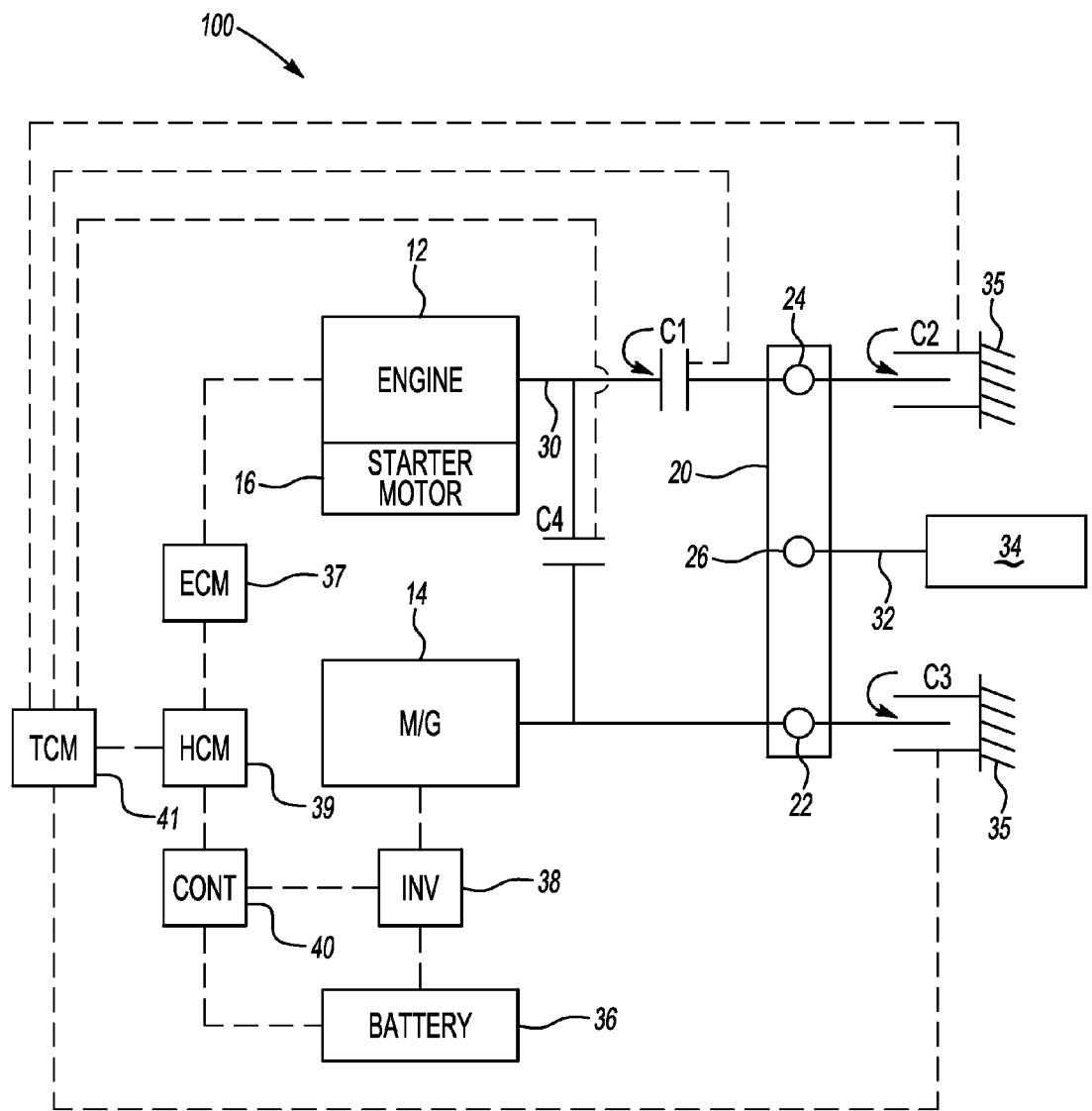
FIG. 2 is a schematic illustration of a second embodiment of a hybrid powertrain.

Referring to FIG. 2, an alternative embodiment of a powertrain 100 is shown. Components identical in configuration and function to those described with respect to the powertrain 10 of FIG. 1 are referred to with the same reference numbers. Powertrain 100 is configured like powertrain 10 except that an additional rotating-type clutch C4 is added. Clutch C4 is selectively engagable under the control of the TCM 41, in communication with the ECM 37, to connect the engine 12 for common rotation with the sun gear member 22. The addition of clutch C4 provides two additional fixed ratio operating modes. A direct drive operating mode is established by engaging both clutches C1 and C4. Torque is provided from the engine 12 to both the ring gear member 24 and the sun gear member 22, causing all components of the planetary gear set 20 as well as the input member 30 and output member 32 to rotate at the same speed. A high torque, fixed gear operating mode is provided by engaging both clutch C4 and brake C2. Torque is provided from engine 12 to the sun gear member 22. Using reaction torque at the ring gear member 24, torque is multiplied through the planetary gear set 20 to provide a greater torque at the carrier member 26 and output member 32 than at the sun gear member 22. This mode enhances vehicle performance as it can be used at relatively high speeds and provides torque multiplication.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
an engine;
an input member, an output member, and a stationary member;
a single planetary gear set having a first, a second, and a third member; wherein the input member is connected for common rotation with the engine; wherein the output member is connected for common rotation with the second member;
a single motor/generator continuously connected for common rotation with the third member without any other motor/generator operatively connected between the input member and the output member;
a starter motor operatively connected to the engine for starting the engine;
a first, a second, and a third torque-transmitting mechanism;
wherein the first torque-transmitting mechanism is selectively engagable to connect the input member for rotation with the first member; wherein the second torque-transmitting mechanism is selectively engagable to ground the first member to the stationary member; wherein the third torque-transmitting mechanism is selectively engagable to ground the third member to the stationary member; and wherein the torque-transmitting mechanisms are engaged in different combinations to establish an electric-only operating mode, an engine-only operating mode; and an electrically-variable operating mode.

2. The hybrid powertrain of claim 1, wherein the second torque-transmitting mechanism is engaged and the motor/generator is operated as a motor to establish the electric-only operating mode.

3. The hybrid powertrain of claim 2, wherein the starter motor is operable to start the engine during the electric-only mode, the first torque-transmitting mechanism is engaged and the second torque-transmitting mechanism disengaged to transition from the electric-only operating mode to the electrically-variable operating mode in which both the engine and the motor/generator provide torque at the output member through the planetary gear set.

4. The hybrid powertrain of claim 1, wherein the first and third torque-transmitting mechanisms are engaged and the engine is powered to provide torque at the output member through the planetary gear set in the engine-only operating mode.

5. The hybrid powertrain of claim 1, wherein the first torque-transmitting mechanism is engaged, the engine is on and the motor/generator is operable as a motor or as a generator to establish the electrically-variable operating mode in which both the engine and the motor/generator provide torque at the output member.

6. The hybrid powertrain of claim 1, further comprising:
a fourth torque-transmitting mechanism selectively engagable to connect the input member for common rotation with the third member.

7. The hybrid powertrain of claim 6, wherein the first and fourth torque-transmitting mechanisms are engaged and the engine is on to provide torque to the output member through the planetary gear set to establish a direct drive fixed gear ratio.

8. The hybrid powertrain of claim 6, wherein the second and fourth torque-transmitting mechanisms are engaged and the engine is on to provide torque to the output member through the planetary gear set to establish an underdrive fixed gear ratio.

9. The hybrid powertrain of claim 1, further comprising:
at least one controller operable to monitor operating conditions of the motor/generator and engage the third torque-transmitting mechanism to brake the motor/generator and engage the first torque-transmitting mechanism to establish the engine-only operating mode in response to the monitored operating conditions indicative of motor-related failure so that no motor/generator is rotating during the engine-only operating mode.

10. The hybrid powertrain of claim 1, wherein the second torque-transmitting mechanism is engaged and the motor/generator is operated as a motor to establish an electric-only operating mode; wherein the first and third torque-transmitting mechanisms are engaged and the engine is on to establish the engine-only operating mode; wherein the first torque-transmitting mechanism is engaged to establish the electrically-variable operating mode; and wherein transitions between any of the modes occur without loss of reaction torque.

11. The hybrid powertrain of claim 1, wherein the vehicle may be launched by slipping the first torque-transmitting mechanism to launch the vehicle using torque from the engine and alternatively by engaging the second torque-transmitting mechanism to launch the vehicle using torque from the motor/generator.

12. The hybrid powertrain of claim 1, wherein the first member is a ring gear member, the second member is a carrier member, and the third member is a sun gear member.

13. A hybrid powertrain for a vehicle comprising:
an engine;
an input member, an output member, and a stationary member;
a single planetary gear set having a ring gear member, a sun gear member and a carrier member; wherein the input member is connected for common rotation with the engine; wherein the output member is connected for common rotation with the carrier member;
a single motor/generator continuously connected for common rotation with the sun gear member; without any other motor/generator operatively connected between the input member and the output member;
a starter motor operatively connected to the engine for starting the engine;
a first, a second, and a third torque-transmitting mechanism;
wherein the first torque-transmitting mechanism is selectively engagable to connect the input member for rotation with the ring gear member; wherein the second torque- transmitting mechanism is selectively engagable to ground the ring gear member to the stationary member; and wherein the third torque-transmitting mechanism is selectively engagable to ground the sun gear member to the stationary member.

14. The hybrid powertrain of claim 13, further comprising:
at least one controller operable to monitor operating conditions of the motor/generator and operatively connected to the torque-transmitting mechanisms to engage the third torque-transmitting mechanism to brake the motor/generator and engage the first torque-transmitting mechanism, to thereby establish an engine-only operating mode in response to the monitored operating conditions indicative of motor-related failure so that no motor/generator is rotating during the engine-only operating mode.

15. The hybrid powertrain of claim 13, further comprising:
a fourth torque-transmitting mechanism selectively engagable to connect the input member for common rotation with the sun gear member.

16. A hybrid powertrain for a vehicle comprising:
an engine;
an input member, an output member, and a stationary member;
a single planetary gear set having a ring gear member, a sun gear member and a carrier member; wherein the input member is connected for common rotation with the engine; wherein the output member is connected for common rotation with the carrier member;
a single motor/generator continuously connected for common rotation with the sun gear member; without any other motor/generator operatively connected between the input member and the output member;
a starter motor operatively connected to the engine for starting the engine;
a first, a second, and a third torque-transmitting mechanism;
wherein the first torque-transmitting mechanism is selectively engagable to connect the input member for rotation with the ring gear member; wherein the second torque-transmitting mechanism is selectively engagable to ground the ring gear member to the stationary member; wherein the third torque-transmitting mechanism is selectively engagable to ground the sun gear member to the stationary member;
a fourth torque-transmitting mechanism selectively engagable to connect the input member for common rotation with the sun gear member;
at least one controller operable to monitor operating conditions of the motor/generator and operatively connected to the torque-transmitting mechanisms to engage the third torque-transmitting mechanism to brake the motor/generator and engage the first torque-transmitting mechanism, to thereby establish an engine-only operating mode in response to the monitored operating conditions indicative of motor failure so that no motor/generator is rotating during the engine-only operating mode.

* * * * *